Jan. 6, 1959   J. N. LEHMAN ET AL   2,867,762
COMMUTATORLESS ELECTRIC MOTOR
Filed April 29, 1955
Fig.1.
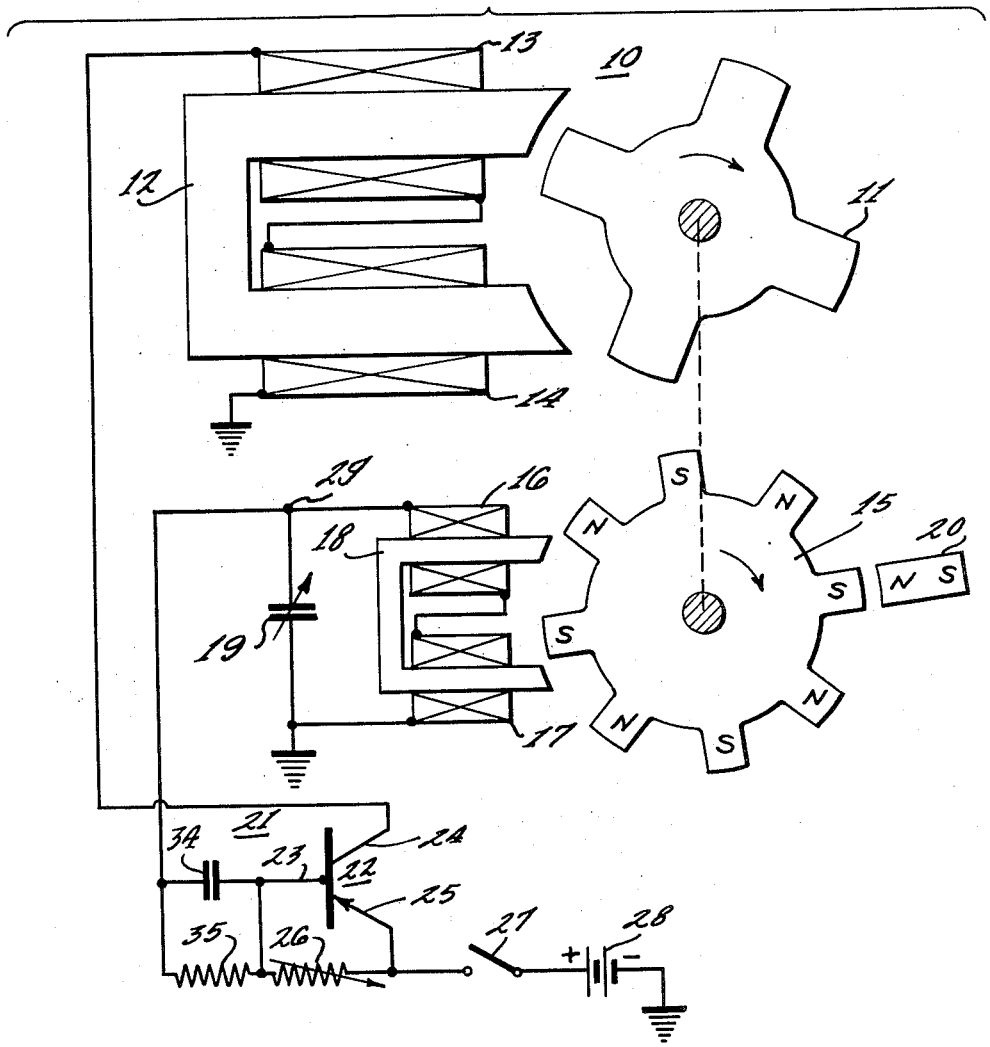
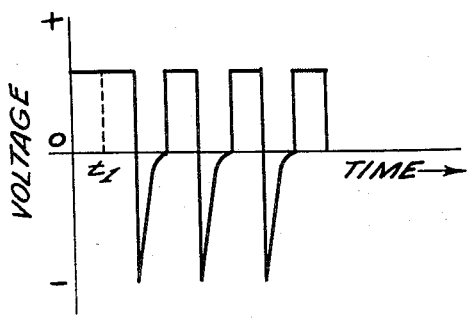
Fig.2.
INVENTORS
James N. Lehman
& John B. Theiss
BY
ATTORNEY United States Patent Office 2,867,762
Patented Jan. 6, 1959

2,867,762

COMMUTATORLESS ELECTRIC MOTOR

James N. Lehman, Mount Ephraim, and John B. Theiss, Collingswood, N. J., assignors to Radio Corporation of America, a corporation of Delaware Application April 29, 1955, Serial No. 504,728

10 Claims. (Cl. 318—254)

The present invention relates to an improved electric motor, and more particularly to an electric motor which may be powered by a small direct-current source, and does not incorporate a mechanical commutating device.

Electric motors which are adaptable to miniaturization are useful in many fields. In electronic equipment, compact and self-contained motors are useful for driving various movable components. Greater efficiency from electric motors is called for at present. Motors used in portable apparatus are ordinarily powered by batteries. Economical operation requires a minimum current drain on the batteries. A motor provided, according to the present invention, is extremely efficient in operation, so that current requirements will be at a minimum. Consequently, it may be used to advantage in portable equipment.

Mechanical commutation is ordinarily used in direct-current motors. A known commutation technique incorporates vibratory contacts, which are connected to the field coil of a motor. As the contacts open and close, the field coil of the motor is alternately energized and deenergized. Several disadvantages are inherent in this technique. The most serious of which is that electrical disturbances created by the vibrating contacts interfere with the operation of electronic equipment near the motor. Moreover, maintenance and inspection of the vibrator contacts is required. Operation of the vibrator produces mechanical vibration which must be cushioned to protect delicate apparatus and to provide for proper operation thereof.

An electric motor, provided according to the present invention, incorporates the above-mentioned desirable features without the disadvantages inherent in the use of vibrating contacts. Briefly described, a motor embodying the present invention utilizes a pickup winding. Recurrent current impulses are generated magnetically in the pickup winding in accordance with the speed of rotation of the motor. These current impulses control a transistor amplifier. Energizing current is supplied to the field winding of the motor by means of the transistor amplifier. The transistor amplifier, when used together with the motor, provides for more efficient operation than was possible heretofore. Moreover, the transistor amplifier, provided by the present invention, permits the motor to be self-starting.

It is an object of the present invention to provide an improved electric motor.

It is a further object of the present invention to provide electric motor apparatus having improved operating efficiency.

It is a still further object of the present invention to provide electric motor apparatus that is adaptable to miniaturization.

It is a still further object of the present invention to provide electric motor apparatus that eliminates the need for mechanical commutators such as vibratory contacts.

It is a still further object of the present invention to provide an improved self-starting electric motor.

Other objects and advantages of the present invention will, of course, become apparent and immediately suggest themselves to those skilled in the art to which the invention is directed from a reading of the following specification in connection with the accompanying drawing in which:

Figure 1 is a schematic presentation of electric motor apparatus provided according to the present invention; and Figure 2 shows a waveform of the voltage across the field coils in the electric motor shown in Figure 1.

Referring now to the drawing, an electric motor 10 is illustrated. This motor contains a rotor 11, having four salient poles and a stator 12. A field winding, consisting of two field coils 13 and 14, is arranged on parallel legs of the stator structure 12. The field coils 13 and 14 are connected together in series. The rotor 11 is made of soft or temporary magnetic material such, for example, as soft iron. Attached to the rotor, by coupling to a common shaft (shown illustratively by a dashed line) is an auxiliary permanent magnet rotor 15. This rotor 15 has eight salient poles, which are formed of permanent magnet material, radially arranged, with equal spacing between them, along the periphery of the rotor 15. Adjacent permanent magnets are of opposite magnetic polarity.

Mounted near the rotor 15, so as to be magnetically coupled to the permanent magnets thereon, is a pickup winding consisting of two pickup coils 16 and 17 connected in series. These coils 16 and 17 are arranged on the parallel legs of a magnetic core member 18. The core member 18 is located along a radial line extending from the center of rotation of the permanent magnet rotor 15. As the permanent magnet rotor 15 turns, it may be observed that the direction of the magnetic field through the magnetic core member 18 will reverse. Consequently, current impulses will be induced into the pickup coils 16 and 17. In other words, the permanent magnet rotor and the pickup coils 16 and 17 form an independent alternating-current generator. The voltage, generated in the pickup coils 16 and 17, is approximately a sine wave in this illustrative embodiment of the present invention.

A variable capacitor 19 is connected in parallel with the pickup coils 16 and 17. The purpose of this capacitor is to control the speed of the motor. The operation of the capacitor 19 will be explained in detail later herein. Adjacent to the permanent magnet rotor 15 is a small, fixed, permanent magnet 20. The function of this magnet 20 is to bring the permanent magnet rotor 15, and consequently, the main rotor 11 in the proper rest position for motor starting.

It is desirable to bring the rotor 11 into the position shown in Figure 1 with respect to the stator 12 before starting the motor 10. At the instant of starting, heavy current will be caused to flow through the field coils 13 and 14. The poles of the stator 12 then become magnetized. The pole of the rotor 11 closest to a stator pole face will be attracted to that pole face. Since a pole of the rotor 11 is closest to the upper pole face of the stator 12, this rotor pole will be attracted thereto. Consequently, the rotor begins turning in a clockwise direction as viewed in Figure 1. Assuming that a pole of the rotor 11 is located directly between the pole faces on the stator 12, the rotor 11 will not move since equal and opposite magnetic forces will be applied to it. If a pole of the rotor 11 were closer to the lower pole face of the stator 12, the rotor 11 will turn in a counter-clockwise direction. It may, therefore, be observed that the initial position of the rotor 11 with respect to the stator 12 determines the direction of rotation of the rotor. It is also desirable to locate the permanent magnet rotor 15 in the position shown with respect to the pickup coils 16 and 17. This is desirable because a voltage of the proper phase for starting the motor is generated and appears across the pickup coils 16 and 17.

A transistor amplifier 21 is provided. This amplifier may utilize either a P-N-P or N-P-N transistor. A P-N-P transistor 22 is shown here for purposes of illustration. However, a N-P-N transistor may be used by reversing the polarity of the supply voltage from the voltage supply source, shown illustratively here as a battery 28 connected to ground and one pole of the switch 27. The phase of the voltage generated in the pickup winding should also be reversed when an N-P-N transistor is used. To obtain a voltage of proper phase for starting the motor, the output connections from the pickup windings 16 and 17 should also be reversed with respect to the connections shown in Figure 1 when a N-P-N transistor is used. Alternatively to reversing the output connections from the pickup windings 16 and 17, the rest position of the magnetic core member 18 with respect to the permanent magnet rotor 15 may be altered so that a north pole is positioned where a south pole is shown as being located.

A single transistor 22 may be used, as illustrated herein, or a plurality of transistors may be connected in parallel to achieve greater power handling capacities if necessary. The transistor 22 has a base 23, a collector 24, and an emitter 25. The transistor 22 is connected as a base-input, common-emitter amplifier 21. The pickup coils 16 and 17 are connected to the input of the transistor amplifier 21. The base 23 of the transistor 21 is connected through a capacitor 34 to the pickup coil 16. A resistor 35 is connected across the capacitor 34 and another resistor 26 is connected between the base 23 and the emitter 25. It may, therefore, be observed that the voltage generated across the pickup coils 16 and 17 is impressed upon the base 23 of the transistor 22. The battery 28 is connected through a switch 27 to the emitter 25 of the transistor 22. Since the capacitor 34 is present together with resistors 35 and 26 there is provided a discharge circuit that aids in providing self-starting action for the motor as will be pointed out hereinafter. The collector 24 is connected to the field winding 13 of the motor 10. When the transistor 22 is connected in the manner described and shown, the magnitude and polarity of the voltage impressed on the base 23 of the transistor 22 determines the value of impedance between the collector 24 and emitter 25 and, therefore, the current passing through the transistor 22 between emitter 25 and collector 24. A negative voltage impressed on the base 23 of the transistor 22 causes the impedance between the emitter 25 and the collector 24 to decrease markedly so that a large current will flow through the transistor 22 from emitter 25 to collector 24. A positive voltage applied to the base 23 makes the impedance between emitter 25 and the collector 24 assume a very high value so that current flow from the emitter 25 to the collector 24 is negligible. Therefore, current will easily flow from the battery 28 through the field windings 13 and 14 of the motor by way of the transistor 22 when the voltage at the base 23 becomes negative.

The operation of the motor apparatus, provided by the present invention, will now be considered. The switch 27 is closed. The capacitors 34 and 19 and the pickup coils 16 and 17 offer negligible impedance to initial current flow. Current will flow through the transistor 22 from the emitter 25 to the base 23 establishing a negative voltage drop across the transistor from base 23 to emitter 25. Heavy conduction then takes place through the transistor 22 from emitter 25 to collector 24. Consequently, this heavy current also flows through the field windings 13 and 14 of the motor. The field winding is sufficiently energized to turn the rotor 11. Current also flows through the resistor 26 connected between emitter 25 and base 23. The magnitude of the emitter to base current is controlled by the resistor 26. The resistor 26 is connected between the emitter 25 and the base 23 so that it provides a shunt around the base 23 and the emitter 25 of the transistor 22. The emitter to base current is, therefore, limited so that this current does not exceed the current rating of the transistor 22. This current flow causes the capacitor 34 to charge at a rate determined by the value of the capacitor 34 and the resistor 26 and the emitter to base resistance of the transistor 22. A positive voltage will be developed across the capacitor 34 from base 23 of the transistor 22 to the terminal 29 of the pickup coils. This positive voltage is impressed upon the base 23 of the transistor 22. After a short period of time, the base voltage will be sufficiently positive to substantially cut-off conduction through the transistor 22 between emitter 25 and collector 24. However, after this period of time, which will be called for purpose of reference, $t_1$, the rotor 11 has turned the permanent magnet rotor 15 so that a voltage is generated across the pickup windings 16 and 17.

It is assumed, for purposes of explanation, that voltage at the terminal 29 connected to the pickup coil 16 is at maximum negative polarity when a south pole passes the upper winding leg of the magnetic core member 18. The maximum positive polarity of the voltage generated by the winding coils 16 and 17 is attained when a negative pole passes the upper winding leg of the core member 18. It will be remembered that the permanent magnet rotor 15 is maintained in the position shown in Figure 1 by means of the positioning magnet 20, and this is the rest position of the rotor 11. Consequently, a negative voltage is generated which appears at terminal 29 when the rotor 11 starts turning. Due to the time delay in the circuit and the mechanical time delay in the motor, this negative voltage is attained after the period of time, $t_1$, has elapsed. As previously mentioned, after passage of time, $t_1$, the capacitor 34 is charged so that a positive base voltage is reached which would cut-off conduction between the emitter 25 and collector 24 of the transistor 22 except for the negative voltage generated by the pickup coils 16 and 17. The voltage developed across the capacitor 34 and applied to the base 23 may be considered a bias voltage.

The voltage generated across the pickup winding 16 and 17 is substantially a sine wave, and has a frequency which is transmitted by the capacitor 34 with negligible attenuation. Consequently, negative voltages will be periodically transmitted by the capacitor 34 and applied to the base 23 of the transistor 22. The magnitude of these negative voltages is greater than the positive bias voltage applied to the base 23. The impedance between collector 24 and emitter 25 of the transistor 22 is thereupon decreased. Sufficient current is transmitted to the field coils 13 and 14 of the motor 10 to produce properly timed impulses of magnetic force that drive the rotor 11. Since there are four salient poles on the rotor 11 and eight oppositely polarized permanent magnets on the permanent magnet rotor 15, one negative cycle of the voltage generated in the pickup coils 16 and 17 will occur for each pole on the rotor 11. Adjustment of the angular position of the permanent magnet rotor 15 with respect to the main rotor 11 is desirable so that an impulse of magnetizing current is supplied by the transistor 22 at the instant when maximum torque may be applied to the rotor 11.

Further control of the period of conduction or duty cycle of the transistor 22 is possible. The resistor 26 connected between emitter 25 and base 23 forms part of a voltage divider and determines the portion of the voltage generated by the pickup coils 16 and 17 which is applied to the base 23. By changing the value of the resistor 26, the portion of the negative cycle of the sinusoidal voltage, which is sufficiently negative to cause the base voltage to become negative is varied, and, consequently, the duty cycle of the transistor 22 is varied.

The waveform of the voltage across the field coils 13 and 14 is shown in Figure 2. The voltage is positive at the instant the motor is started by closing the switch 27. The period of initial conduction through the transistor 22 from emitter 25 to collector 24 extends until time, $t_1$. A negative voltage is then applied to the base 23 from the pickup windings 16 and 17. This increases the initial period of conduction. Thereafter, positive voltages appear across the field windings 13 and 14 when conduction between emitter 24 and collector 25 of the transistor 22 occurs. As the voltage generated by the pickup coils 16 and 17 goes positive, a sharp negative transient appears in the voltage wave across the field windings 13 and 14. This transient is characteristic of current cut-off in the inductive circuit formed by the field windings 13 and 14.

The capacitor 19, which is connected across the pickup windings 16 and 17, functions as a tuning capacitor or filter. A tuned circuit is formed by this capacitor 19 in conjunction with pickup coils 16 and 17. The frequency of the sinusoidal voltage generated by the pickup coils 16 and 17 is held, within a considerable range, to the resonant frequency of this tuned circuit. The frequency of the voltage generated by the pickup windings 16 and 17 determines the frequency of the magnetizing current impulses supplied to the field windings 13 and 14. Consequently, the speed of rotation of the motor 10 will be altered. Since motor 10, permanent magnet rotor 15, pickup coils 16 and 17 and the transistor amplifier 21 form a closed loop feedback system, the speed of rotation of the permanent magnet rotor 15 will be increased or decreased so as to maintain the frequency of the voltage generated in the pickup windings 16 and 17 at the resonant frequency of the tuned circuit formed by the pickup coils 16 and 17 and the capacitor 19. By adjusting the value of the capacitor 19, control of the speed of rotation of the motor is possible.

If the motor is stopped with power on, it may be started again by opening and closing the switch 27 connected to the battery 28. Opening the switch 27 allows the capacitor 34 to discharge through the resistor 35 connected in shunt therewith. With the condenser discharged, positive voltage cannot be applied to the base 23 of the transistor 22. The motor will start again in the manner described above.

There has been described an improved electric motor apparatus that overcomes many of the disadvantages of vibratory contact motors by the novel use in combination with a transistor amplifier. In conclusion, it is again stated that the transistor 22 provides for automatic starting of the motor by allowing heavy initial conduction upon the closing of the switch 27. Self-starting of the motor 10 is thereby accomplished in a convenient and efficient manner.

What is claimed is:

1. The combination with an electric motor having a rotor, a stator and a field winding upon said stator of a power supply and control means for said motor comprising means for generating a current which is repetitive periodically according to the speed of rotation of said rotor, terminal means providing a connection for a source of direct-current, means connected to said terminal means for energizing said field winding from said direct current source when said rotor is at rest so as to provide for self-starting thereof, and means associated with said last named means for energizing said field winding from said source for intervals determined by the direction of said periodically varying current.

2. Electric motor apparatus comprising a rotor, an exciting winding adjacent to said rotor, means for generating a repetitive current having its repetition frequency determined by the speed of rotation of said rotor, means providing energizing current for said exciting winding, means controlled by said repetitive current for intermittently applying said energizing current to said exciting winding, and means for initiating rotation of said rotor when said rotor is at rest included in said last-named means.

3. Apparatus for operating a motor from a direct-current source comprising means for generating recurrent impulses having a repetition frequency determined by the speed of rotation of said motor, a transistor amplifier operated from said direct-current source, said transistor amplifier having an input circuit and an output circuit, means for applying said current impulses to said input circuit, means for connecting said motor in said output circuit, and means connected into said input circuit providing self-starting action for said motor.

4. Electric motor apparatus comprising a stator and a rotor, a field winding on said stator, a pickup winding, means for generating an alternating voltage in said pickup winding which has a frequency determined by the speed of rotation of said rotor, a transistor amplifier, an input circuit and an output circuit for said transistor amplifier, means for connecting said pickup winding to said input circuit, means for connecting said field winding to said output circuit, and means included in said input circuit for applying current to said field winding for a predetermined interval when said rotor is at rest.

5. Electric motor apparatus comprising a stator and a rotor, a field winding on said stator, a pickup coil, means for establishing and intermittently interrupting a magnetic field through said pickup coil, said means including a second rotor connected for rotation with said first-named rotor, a transistor amplifier having an input circuit and an output circuit, means for connecting said pickup coil in said input circuit, means for connecting said field winding in said output circuit, and a discharge circuit included in said input circuit for energizing said output circuit to supply current to said field winding for a given interval when said rotor is at rest.

6. Electric motor apparatus comprising a stator and a rotor, a field winding on said stator, an auxiliary rotor coupled to said first-named rotor, a plurality of radially arranged permanent magnets mounted on the periphery of said auxiliary rotor, a pickup coil mounted near said auxiliary rotor periphery, a transistor amplifier including a transistor having a base, an emitter and a collector, an input circuit for said amplifier connected to said base, said input circuit being a discharge circuit having a predetermined charging rate, an output circuit for said amplifier connected to said collector, and means providing a source of direct current operating power for said transistor connected to said emitter, said pickup coil being connected to said input circuit, and said field winding being connected in said output circuit.

7. Electric motor apparatus, according to claim 6, wherein said discharge circuit includes a capacitor connected between said pickup coil and said base.

8. Electric motor apparatus, according to claim 6, wherein a capacitor is connected in parallel with said pickup coil for controlling the speed of rotation of said rotor.

9. Electric motor apparatus comprising a stator, a rotor and a field winding on said stator, a rotatable member driven by said rotor, a plurality of permanent magnets radially arranged with equal spacing therebetween along the periphery of said rotatable member with poles of opposite magnetic polarity adjacent to each other, a core member of magnetic material, a pickup winding on said core member, said core member being arranged along a radial line extending from the center of rotation of said rotatable member near the path of rotation of said permanent magnets whereby a magnetic circuit is intermittently completed between adjacent ones of said permanent magnets through said core member, a transistor amplifier including a transistor having a base, a collector and an emitter, a capacitor, a resistor, a circuit including said capacitor and said resistor connected in parallel for connecting said pick-up winding on said magnetic core to said base, another resistor being connected between said base and said emitter, and means for connecting direct-current operating potentials to said emitter, said collector being connected to said field winding.

10. Electric motor apparatus, according to claim 9, including means for bringing said rotor to a predetermined rest position, said last-named means comprising a permanent magnet.

References Cited in the file of this patent

UNITED STATES PATENTS

| | | |
|---|---|---|
| 1,563,084 | Harris | Nov. 24, 1925 |
| 2,427,920 | Morrison | Sept. 23, 1947 |
| 2,492,045 | Jacubowitz | Dec. 20, 1949 |
| 2,492,435 | Ostline | Dec. 27, 1949 |
| 2,574,997 | Askren | Nov. 13, 1951 |
| 2,648,786 | Kritter | Aug. 11, 1953 |
| 2,719,944 | Brailsford | Oct. 4, 1955 |